M. MITCHELL.
Milk-Cans.

No. 151,998.

Patented June 16, 1874.

Witnesses.
E. A. Hart
N. D. Chamberlain

Inventor
Morris Mitchell
Per G. H. Faust
Attorney

UNITED STATES PATENT OFFICE.

MORRIS MITCHELL, OF CHICAGO, ILLINOIS.

IMPROVEMENT IN MILK-CANS.

Specification forming part of Letters Patent No. 151,998, dated June 16, 1874; application filed April 13, 1874.

*To all whom it may concern:*

Be it known that I, MORRIS MITCHELL, of Chicago, in the county of Cook and State of Illinois, have invented a new and useful Improvement in Milk-Cans; and I do hereby declare the following to be a clear and exact description thereof, reference being had to the accompanying drawings forming part of this specification, in which—

Figure 1:
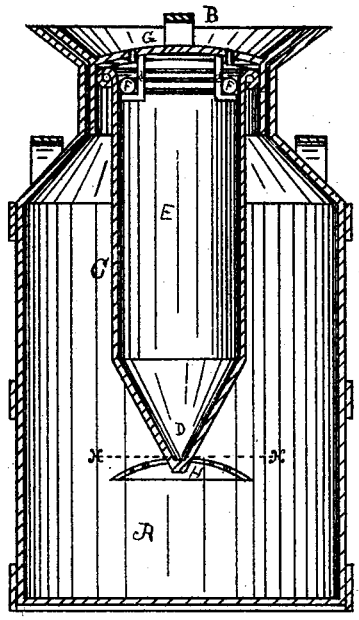
Figure 3:
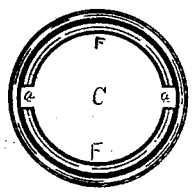
Figure 4:
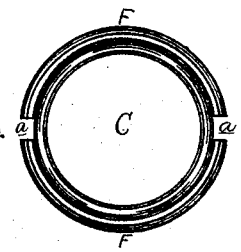
Figure 2:
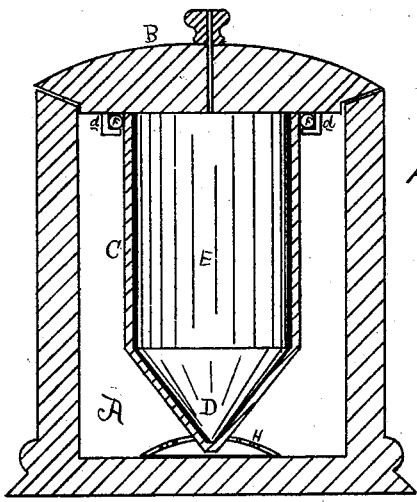
Figure 5:
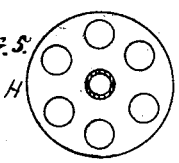

Figure 1 is a vertical cross-section of a milk-can containing my improvement. Fig. 2 is a modified form of the same when applied to water-coolers. Figs. 3 and 4 are top views of the cooler proper detached; and Fig. 5 is a cross-section of the cooler, taken on dotted line $x\,x$, Fig. 1.

Similar letters of reference indicate corresponding parts in the several figures of the drawing.

The object of my invention is to provide an improved milk-can so arranged as to preserve the milk for a great length of time, thereby enabling the same to be transported long distances with perfect safety; and to that end it consists in a novel device arranged within the center of the can, and adapted to receive a quantity of ice, by means of which the milk is thoroughly cooled, as will be hereinafter fully shown.

In the accompanying drawing, A represents the can, and B the cover, which are made in the usual manner. C is the cooler, which consists of a cylindrical case made conical at its lower end, as shown at D. This case is made hollow, forming a chamber, E, which is open at its upper end, to allow the same to be filled with ice when desired. Permanently attached to the upper end of the outer or inner surface of the chamber is a metal flange or shoulder, F, which is so formed as to provide vertical grooves $a\,a$ extending across the same, as shown in Figs. 3 and 4. Attached to the lower surface of the cover B are depending stirrups $d\,d$, which extend downward sufficiently to pass the grooves $a\,a$, as shown in Fig. 1. The arrangement of these stirrups is such as to engage the lower surface of the flange when the chamber is turned partially around, by which means the chamber is firmly attached to the cover. Secured to the lower surface of the cover is a flexible packing, G, against which the upper end of the chamber rests, the object of which is to secure a water-tight joint, thereby preventing the milk within the can from passing into the chamber. The cover B is provided with a series of perforations, the object of which is to allow the heated air or steam that arises from the milk to pass off. The arrangement of the perforations is such that they can be closed by simply turning the cover partially around on the chamber, which prevents the fluid from escaping from the can during transportation. Permanently attached to the lower extremity of the chamber is a perforated flange, H, the object of which is to agitate the fluid by an ascending and descending movement of the chamber, thereby equalizing the temperature of the fluid by bringing the same in contact with the cooling-chamber.

In using my invention, the can and the chamber filled with ice, is secured to the cover, as heretofore described, and is placed upon the can in the usual manner; and by the milk coming in contact with the cooling-chamber the same is kept cool and of a uniform temperature, thereby enabling the same to be transported to a much greater distance than could be done with the ordinary can.

In using my invention for water-coolers, I provide an outer case of wood or metal, as shown in Fig. 2, and arrange the cooling-chamber as before described.

Having thus described my invention, what I claim, and desire to secure by Letters Patent, is—

A milk-can having an ice-chamber pendent from the cover, within which cover is arranged the spring-disk, the said chamber carrying beneath it the perforated flange, all substantially as shown and described.

The above specification of my invention signed by me this 28th day of January, 1874.

M. MITCHELL.

Witnesses:
 E. H. HART,
 G. H. FROST.